US007688888B2

United States Patent
Brown et al.

(10) Patent No.: US 7,688,888 B2
(45) Date of Patent: Mar. 30, 2010

(54) CIR ESTIMATING DECISION FEEDBACK EQUALIZER WITH PHASE TRACKER

(75) Inventors: Tyler Brown, Mundelein, IL (US); Mark Fimoff, Hoffman Estates, IL (US); Sreenivasa M. Nerayanuru, Wheeling, IL (US); Gregory Tomezak, Buffalo Grove, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 1293 days.

(21) Appl. No.: 11/112,610

(22) Filed: Apr. 22, 2005

(65) Prior Publication Data
US 2006/0239339 A1 Oct. 26, 2006

(51) Int. Cl.
*H03H 7/40* (2006.01)
(52) U.S. Cl. .................. 375/232; 375/229; 375/350; 375/321; 375/265; 375/341
(58) Field of Classification Search ......... 375/229–233, 375/350, 321, 265, 269, 279, 362, 355, 308, 375/334, 341; 704/242; 333/18; 708/5, 708/8, 21, 404, 242
See application file for complete search history.

(56) References Cited

U.S. PATENT DOCUMENTS

| 4,833,693 | A | | 5/1989 | Eyuboglu | |
|---|---|---|---|---|---|
| 5,406,587 | A | | 4/1995 | Horwitz et al. | |
| 5,533,065 | A | * | 7/1996 | Blaker et al. | 375/341 |
| 6,226,049 | B1 | * | 5/2001 | Oh | 348/607 |
| 6,823,489 | B2 | * | 11/2004 | Wittig et al. | 714/792 |
| 7,349,502 | B2 | * | 3/2008 | Kim et al. | 375/346 |
| 2001/0018651 | A1 | * | 8/2001 | Takamizawa | 704/230 |
| 2002/0036714 | A1 | * | 3/2002 | Markman | 348/607 |
| 2002/0154248 | A1 | | 10/2002 | Wittig et al. | |
| 2002/0186762 | A1 | * | 12/2002 | Xia et al. | 375/232 |

FOREIGN PATENT DOCUMENTS

EP 0 656 712 A1 * 6/1995
EP 656712 A1 * 6/1995

* cited by examiner

*Primary Examiner*—David C Payne
*Assistant Examiner*—Rahel Guarino (57) ABSTRACT

An output of an equalizer is decoded to produce first decoded data having a first accuracy. The output of the equalizer is further decoded to produce second decoded data having a second accuracy, and the second accuracy is greater than the first accuracy. Tap weights for the equalizer are calculated using the first and second decoded data. The calculated tap weights are applied to the taps of the equalizer.

39 Claims, 5 Drawing Sheets

CIR ESTIMATING DECISION FEEDBACK EQUALIZER WITH PHASE TRACKER

RELATED APPLICATION

This application contains subject matter similar to that disclosed in U.S. patent application Ser. No. 10/421,014 filed on Apr. 22, 2003.

TECHNICAL FIELD OF THE INVENTION

The present invention relates to equalizers and, more particularly, to equalizers that adapt to the condition of a channel through which signals are received.

BACKGROUND OF THE INVENTION

Since the adoption of the ATSC digital television (DTV) standard in 1996, there has been an ongoing effort to improve the design of receivers built for the ATSC DTV signal. The primary obstacle that faces designers in designing receivers so that they achieve good reception is the presence of multipath interference in the channel. Such multipath interference affects the ability of the receiver to recover signal components such as the carrier and symbol clock. Therefore, designers add equalizers to receivers in order to cancel the effects of multipath interference and thereby improve signal reception.

The broadcast television channel is a relatively severe multipath environment due to a variety of conditions that are encountered in the channel and at the receiver. Strong interfering signals may arrive at the receiver both before and after the largest amplitude signal. In addition, the signal transmitted through the channel is subject to time varying channel conditions due to the movement of the transmitter and signal reflectors, airplane flutter, and, for indoor reception, people walking around the room. If mobile reception is desired, movement of the receiver must also be considered.

The ATSC DTV signal uses a 12-phase trellis coded 8-level vestigial sideband (usually referred to as 8T-VSB or, more simply, as 8-VSB) as the modulation method. There are several characteristics of the 8-VSB signal that make it special compared to most linear modulation methods (such as QPSK or QAM) that are currently used for wireless transmission. For example, 8-VSB data symbols are real and have a signal pulse shape that is complex. Only the real part of the complex pulse shape is a Nyquist pulse. Therefore, the imaginary part of the complex pulse shape contributes intersymbol interference (ISI) when the channel gain seen by the equalizer is not real, even if there is no multipath.

Also, due to the low excess bandwidth, the signal is nearly single sideband. As a result, symbol rate sampling of the complex received signal is well above the Nyquist rate. Symbol rate sampling of the real or imaginary part of the received signal is just below the Nyquist rate.

Because the channel is not known a priori at the receiver, the equalizer must be able to modify its response to match the channel conditions that it encounters and to adapt to changes in those channel conditions. To aid in the convergence of an adaptive equalizer to the channel conditions, the field sync segment of the frame as defined in the ATSC standard may be used as a training sequence for the equalizer. But when equalization is done in the time domain, long equalizers (those having many taps) are required due to the long channel impulse responses that characterize the channel. Indeed, channels are often characterized by impulse responses that can be several hundreds of symbols long.

The original Grand Alliance receiver used an adaptive decision feedback equalizer (DFE) with 256 taps. The adaptive decision feedback equalizer was adapted to the channel using a standard least mean square (LMS) algorithm, and was trained with the field sync segment of the transmitted frame. Because the field sync segment is transmitted relatively infrequently (about every 260,000 symbols), the total convergence time of this equalizer is quite long if the equalizer only adapts on training symbols prior to convergence.

In order to adapt equalizers to follow channel variations that occur between training sequences, it had been thought that blind and decision directed methods could be added to equalizers. However, when implemented in a realistic system, these methods may require several data fields to achieve convergence, and convergence may not be achieved at all under difficult multipath conditions.

In any event, because multipath signals in the broadcast channel may arrive many symbols after the main signal, the decision feedback equalizer is invariably used in 8-VSB applications. However, it is well known that error propagation is one of the primary drawbacks of the decision feedback equalizer. Therefore, under severe multipath conditions, steps must be taken to control the effect of error propagation.

In a coded system, it is known to insert a decoder into the feedback path of the decision feedback equalizer to use the tentative decision of the decoder in adapting the equalizer to channel conditions. This method, or a variant of it, is applicable to the 8-VSB signal by way of the output of the trellis decoder. As discussed above, the ATSC DTV signal is a 12-phase trellis coded digital vestigial sideband signal with 8 signal levels known as 8T-VSB.

Figure 1:
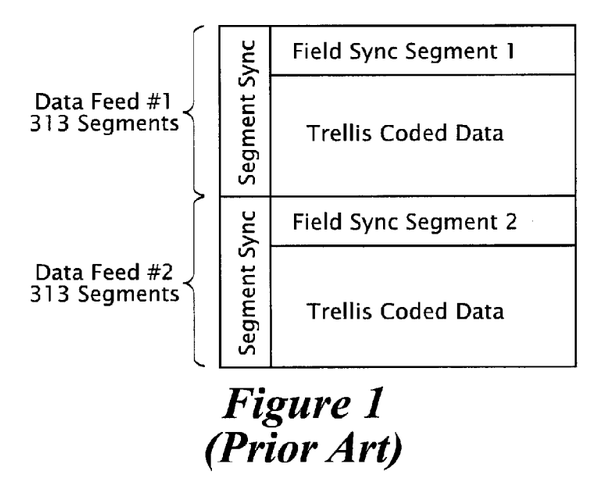
FIG. 1 illustrates a data frame according to the ATSC DTV standard.

In ATSC DTV systems, data is transmitted in frames as shown in FIG. 1. Each frame contains two data fields, each data field contains 313 segments, and each segment contains 832 symbols. The first four of these symbols in each segment are segment sync symbols having the sequence [+5, −5, −5, +5].

Figure 2:
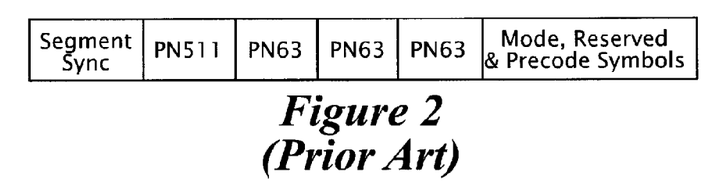
FIG. 2 illustrates the field sync segment of the fields comprising the frame of FIG. 1.

The first segment in each field is a field sync segment. As shown in FIG. 2, the field sync segment comprises the four segment sync symbols discussed above followed by a pseudo-noise sequence having a length of 511 symbols (PN511) followed in turn by three pseudo-noise sequences each having a length of 63 symbols (PN63). Like the segment sync symbols, all four of the pseudo-noise sequences are composed of symbols from the set {+5, −5}. In alternate fields, the three PN63 sequences are identical; in the remaining fields, the center PN63 sequence is inverted. The pseudo-noise sequences are followed by 128 symbols, which are composed of various mode, reserved, and precode symbols.

Because the first 704 symbols of each field sync segment are known, these symbols, as discussed above, may be used as a training sequence for an adaptive equalizer. All of the three PN63 sequences can be used only when the particular field being transmitted is detected so that the polarity of the center sequence is known. The remaining data in the other 312 segments comprises trellis coded 8-VSB symbols. This data, of course, is not known a-priori by the receiver.

Figure 3:
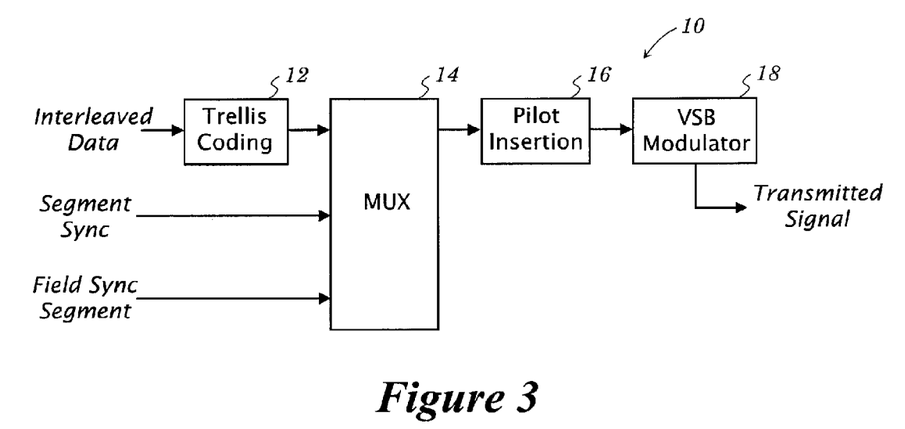
FIG. 3 illustrates a portion of a transmitter relevant to the transmitting of an 8T-VSB signal.

A transmitter 10 for transmitting the 8T-VSB signal is shown at a very high level in FIG. 3. The transmitted baseband 8T-VSB signal is generated from interleaved Reed-Solomon coded data. After trellis coding by a trellis encoder 12, a multiplexer 14 adds the segment sync symbols and the field sync segment to the trellis coded data at the appropriate times in the frame. A pilot inserter 16 then inserts a pilot carrier by adding a DC level to the baseband signal, and a modulator 18 modulates the resulting symbols. The modulated symbols are transmitted as a vestigial sideband (VSB) signal at a rate of 10.76 MHz.

Figure 4:
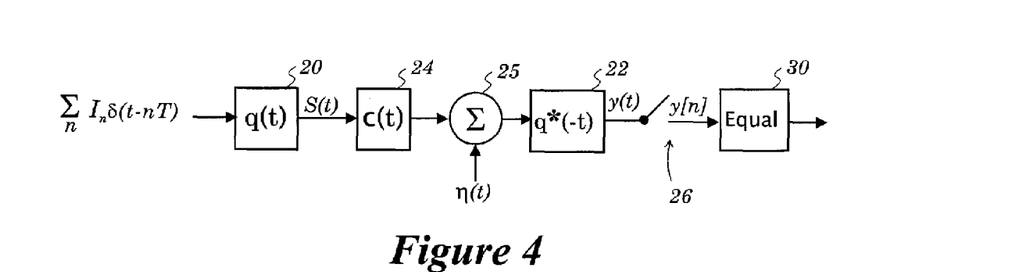
FIG. 4 illustrates portions of a transmitter and receiver relevant to the present invention.

FIG. 4 shows the portions of the transmitter and receiver relevant to the analysis presented herein. The transmitted signal has a raised cosine spectrum with a nominal bandwidth of 5.38 MHz and an excess bandwidth of 11.5% of the channel centered at one-fourth of the symbol rate (i.e., 2.69 MHz). Thus, the transmitted pulse shape q(t) (block 20, FIG. 4) is complex and is given by the following equation:

$$q(t) = e^{j\pi F_s t/2} q_{RRC}(t) \qquad (1)$$

where $F_s$ is the symbol frequency, and $q_{RRC}(t)$ is a real square root raised cosine pulse with an excess bandwidth of 11.5% of the channel. Thus, the pulse q(t) is a complex root raised cosine pulse.

The baseband transmitted signal waveform of data rate 1/T symbols/sec is represented by the following equation:

$$s(t) = \sum_k I_k q(t - kT) \qquad (2)$$

where $$\{I_k \in A \equiv \{\alpha_1, \ldots \alpha_8\} \subset R^1\}$$

is the transmitted data sequence, which is a discrete 8-ary sequence taking values on the real 8-ary alphabet A. The function q(t) is the transmitter's pulse shaping filter of finite support $[-T_q/2, T_q/2]$. The overall complex pulse shape at the output of the matching filter in the receiver is denoted p(t) and is given by the following equation:

$$p(t) = q(t) * q^*(-t) \qquad (3)$$

where q*(-t) (block 22, FIG. 4) is the receiver matched filter impulse response.

Although it is not required, it may be assumed for the sake of simplifying the notation that the span $T_q$ of the transmit filter and the receive filter is an integer multiple of the symbol period T; that is, $T_q = N_q T = 2L_q T$, $L_q$ is a real integer greater than zero. For the 8-VSB system, the transmitter pulse shape is the Hermitian symmetric root raised cosine pulse, which implies that q(t)=q*(-t). Therefore, $q[n] \equiv q(t)|_{t=nT}$ is used below to denote both the discrete transmit filter and discrete receive filter.

The physical channel between the transmitter and the receiver is denoted c(t) (block 24, FIG. 4). The concatenation of p(t) and the channel is denoted h(t) and is given by the following equation:

$$h(t,\tau) = q(t) * c(t,\tau) * q^*(-t) = p(t) * c(t,\tau) \qquad (4)$$

The physical channel $c(t, \tau)$ is generally described as a time varying channel by the following impulse response:

$$c(t, \tau) = \sum_{k=-L_{ha}}^{L_{hc}} c_k(\tau) \delta(t - \tau_k) \qquad (5)$$

where $\{c_k(\tau)\} \subset C^1$, and where $-L_{ha} \leq k \leq L_{hc}$, t, $\tau \epsilon R$, and $\{\tau_k\}$ denote the multipath delays, or the time of arrivals (TOA), and where $\delta(t)$ is the Dirac delta function. It is assumed that the time variations of the channel are slow enough that $c(t, \tau) = c(t)$. Thus, the channel is assumed to be a fixed (static) intersymbol interference channel throughout the training period such that $c_k(\tau) = c_k$, which in turn implies the following equation:

$$c(t) = \sum_{k=-L_{ha}}^{L_{hc}} c_k \delta(t - \tau_k) \qquad (6)$$

for $0 \leq t \leq L_n T$, where $L_n$ is the number of training symbols, and the summation indices $L_{ha}$ and $L_{hc}$ refer to the number of maximum anti-causal and causal multipath delays, respectively.

In general, $c_k = \tilde{c}_k e^{-j2\pi f_c \tau_k}$ where $\tilde{c}_k$ is the amplitude of the k'th multipath, and $f_c$ is the carrier frequency. It is also inherently assumed that $\tau_k < 0$ for $-L_{ha} \leq k \leq -1$, $\tau_0 = 0$, and $\tau_k > 0$ for $1 \leq k \leq L_{hc}$. The multipath delays $\tau_k$ are not assumed to be at integer multiples of the sampling period T.

Equations (4) and (6) may be combined according to the following equation (where the $\tau$ index has been dropped):

$$h(t) = p(t) * c(t) = \sum_{-L_{ha}}^{L_{hc}} c_k p(t - \tau_k) \qquad (7)$$

Because both p(t) and c(t) are complex valued functions, the overall channel impulse response h(t) is also complex valued. By using the notation introduced herein, the matched filter output y(t) in the receiver is given by the following equation:

$$y(t) = \left( \sum_k \delta(t - kT) \right) * h(t) + v(t) \qquad (8)$$

where $$v(t) = \eta(t) * q^*(-t) \qquad (9)$$

denotes the complex (colored) noise process after the pulse matched filter (denoted by block 25, FIG. 4), with η(t) being a zero-mean white Gaussian noise process with spectral density $\sigma_\eta^2$ per real and imaginary part. The matched filter output y(t) can also be written in terms of its real and imaginary parts as $y(t) = y_I(t) + j y_Q(t)$.

Sampling the matched filter output y(t) (sampler 26, FIG. 4) at the symbol rate produces the discrete time representation of the overall communication system according to the following equation:

$$y[n] \equiv y(t)|_{t=nT} = \sum_k I_k h[n-k] + v[n] \qquad (10)$$

Prior art equalizers have known problems previously discussed, such as difficulty converging under severe multipath conditions.

The present invention provides a novel technique to provide improved convergence time of equalizers and/or to solve other problems associated with equalizers.

SUMMARY OF THE INVENTION

In accordance with one aspect of the present invention, a method of operating an equalizer having taps comprises the following: equalizing received symbols by use of the equalizer to produce equalized symbols; applying a correction to the equalized symbols to produce corrected symbols characterized by a processing delay d; decoding the equalized symbols to provide first symbol decisions; decoding the corrected symbols to provide second symbol decisions; calculating tap weights for the equalizer in response to sequences of n received symbols and corresponding sequences of n decoded symbols, wherein the sequences of n decoded symbols are based on an amount d of the first symbol decisions and an amount n-d of the second symbol decisions; and, applying the calculated tap weights to the equalizer.

In accordance with another aspect of the present invention, a system comprises an equalizer, a signal corrector, first and second decoders, and a tap weight calculator. The equalizer has taps with tap weights. The signal corrector produces a corrected output based on an output of the equalizer, and the corrected output is characterized by a delay d; the first decoder decodes the output of the equalizer to recover first decoded data. The second decoder decodes the corrected output to recover second decoded data. The tap weight calculator calculates and applies the tap weights to the equalizer based upon a channel impulse response determined from a received signal of amount n, from an amount d of the first decoded data, and from an amount n-d of the second decoded data.

In accordance with still another aspect of the present invention, a method of operating an equalizer having taps comprises the following: decoding an output of the equalizer to produce first decoded data having a first accuracy; decoding the output of the equalizer to produce second decoded data having a second accuracy, wherein the second accuracy is greater than the first accuracy; calculating tap weights for the equalizer using the first and second decoded data; and, applying the calculated tap weights to the taps of the equalizer.

BRIEF DESCRIPTION OF THE DRAWINGS

These and other features and advantages will become more apparent from a detailed consideration of the invention when taken in conjunction with the drawings in which.

DETAILED DESCRIPTION

Figure 5:
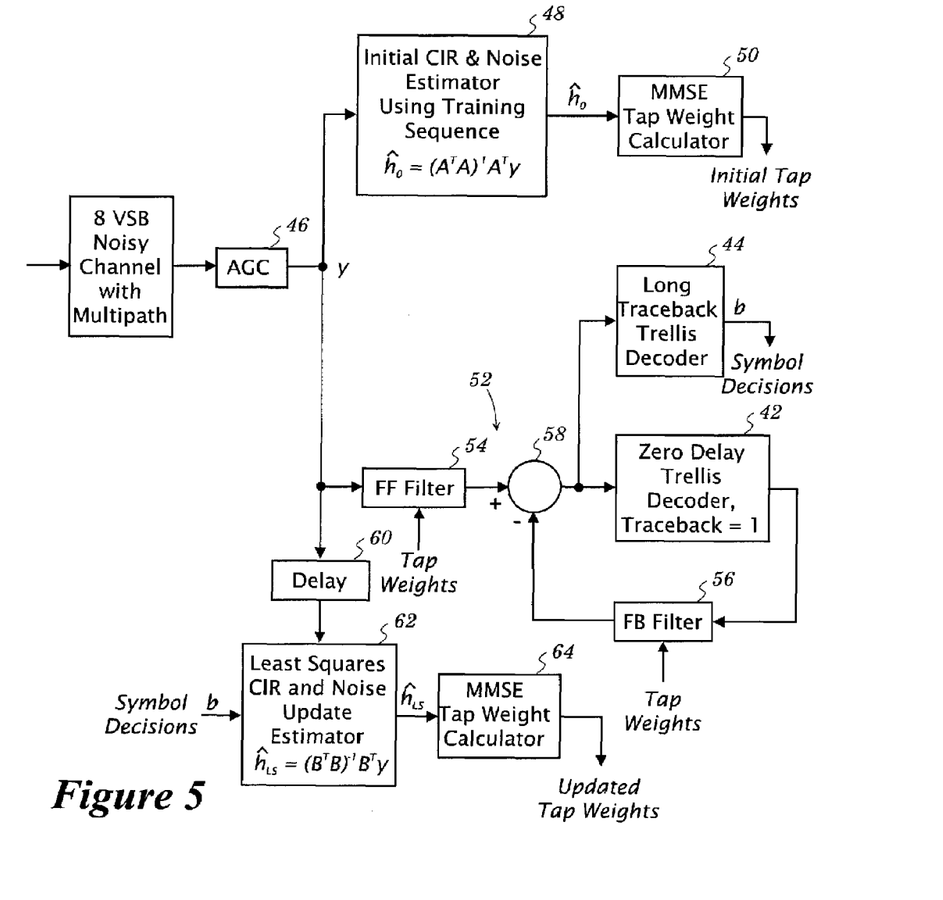
FIG. 5 illustrates a tracking decision feedback equalizer system as disclosed in the '014 application.

FIG. 5 illustrates a decision feedback equalizer system 40 that avoids and/or mitigates the convergence and/or tracking problems of previous decision feedback equalizers. The tap weights are calculated based on estimates of the channel impulse response. This arrangement makes use of two 12-phase trellis decoders 42 and 44. The 12-phase trellis decoder 42 has a short traceback depth, and the 12-phase trellis decoder 44 has a long traceback depth.

The signal from the channel is processed by an automatic gain controller 46, which provides the output y. An initial channel impulse response and noise estimator 48 uses the training sequence to provide an initial estimate $\hat{h}_0$ of the channel impulse response. A tap weight calculator 50 calculates an initial set of tap weights based on the initial estimate $\hat{h}_0$ of the channel impulse response using, for example, a MMSE based algorithm, and supplies this initial set of tap weights to a decision feedback equalizer 52 comprising a feed forward filter 54 and a feedback filter 56.

The decision feedback equalizer 52 equalizes the data symbols contained in the output y based on these initial tap weights and includes a summer 58 which supplies the output of the decision feedback equalizer 52 to the short traceback 12-phase trellis decoder 42 and to the long traceback 12-phase trellis decoder 44. The output of the long traceback 12-phase trellis decoder 44 forms the symbol decisions b. The feedback filter 56 filters the output of the short traceback 12-phase trellis decoder 42, and the filtered output of the feedback filter 56 is subtracted by the summer 58 from the output of the feed forward filter 54.

The output y is delayed by a delay 60, and the delayed output y and the symbol decisions b are processed by a least squares channel impulse and noise update estimator 62 that produces an updated channel impulse estimate $\hat{h}_{LS}$. A tap weight calculator 64 uses the updated channel impulse estimate $\hat{h}_{LS}$ to calculate an updated set of tap weights for the decision feedback equalizer 52. The tap weights determined by the tap weight calculator 64 are provided to the decision feedback equalizer 52 during periods when the tap weights based on the training sequence are not available. The delay imposed by the delay 60 is equal to the delay of the decision feedback equalizer 52 and of the long traceback 12-phase trellis decoder 44.

In a transmitter according to the ATSC standard, 8 VSB data symbols are trellis coded utilizing a 12-phase coding technique. Most commonly, a decision feedback equalizer in an 8 VSB receiver is expected to use an 8 level slicer for a symbol decision device in the feedback loop of the decision feedback equalizer. However, the use of an 8 level slicer may result in many symbol decision errors being fed to the feedback filter when the channel has significant multipath distortion or a low signal to noise ratio. These errors give rise to further errors resulting in what is called error propagation within the decision feedback equalizer. This error propagation greatly degrades the performance of the decision feedback equalizer.

Because the data symbols in an 8 VSB system are trellis coded, trellis decoding can be used in the symbol decision device in order to reduce the number of symbol decision errors. The reliability of a trellis decoder is proportional to its traceback depth. Trellis decoders with a longer traceback depth produce more reliable decisions, but the decision process then incurs a longer delay. On the other hand, a zero delay trellis decoder can be constructed having a traceback depth of one. While the symbol decisions of the zero delay trellis decoder are less reliable than a trellis decoder with a longer delay, the zero delay trellis decoder is still significantly more reliable than an 8 level slicer.

It is well known that, if a symbol decision device with a delay greater than zero is used as the symbol decision device for a decision feedback equalizer, a problem is created with respect to cancellation of short delay multipath. Therefore, decision feedback equalizers for 8 VSB receivers with a zero delay 12-phase trellis decoder in the feedback loop have been described for reducing error propagation. That method is used in the decision feedback equalizer system 40 of FIG. 5.

The output of the decision feedback equalizer 52 is fed to the long traceback depth 12-phase trellis decoder 44 (i.e., a long delay trellis decoder having, for example, a traceback depth=32 and a delay=12×31=372 symbols). The long traceback depth 12-phase trellis decoder 44, whose decisions are more reliable than those of the short traceback depth 12-phase trellis decoder 42, provides the final symbol decisions for subsequent receiver stages. Also, the long traceback depth 12-phase trellis decoder 44 provides the symbol decisions b used by the least squares channel impulse and noise update estimator 62, whose output is in turn used by the tap weight calculator 64 for calculating updated tap weights for the decision feedback equalizer 52 so that the decision feedback equalizer 52 can follow channel impulse response variations that occur between training sequences.

At initialization, the initial channel impulse response estimate $\hat{h}_0$ is formed from the received training sequence by the initial channel impulse response and noise estimator 48, and an initial set of tap weights are calculated by the tap weight calculator 50 from that channel impulse response estimate $\hat{h}_0$. Then, as the decision feedback equalizer 52 runs, reliable symbols decisions are taken from the long traceback 12-phase trellis decoder 44 and are used as the decoded output.

Also, relatively long pseudo training sequences b are formed from the output of the long traceback 12-phase trellis decoder 44. These long pseudo training sequences are used by the least squares channel impulse and noise update estimator 62 to calculate the updated channel impulse response estimates $\hat{h}_{LS}$, and the tap weight calculator 64 uses the updated channel impulse response estimates $\hat{h}_{LS}$ to calculate updated tap weights for the decision feedback equalizer 52. This procedure allows for the tracking of time varying channel impulse responses.

The initial channel estimate calculated by the initial channel impulse response and noise estimator 48 is based on the received training sequence. Different known methods are available for calculating this initial channel estimate. For example, in a simple version of one of these known methods, the channel impulse response is of length $L_h=L_{ha}+L_{hc}+1$ where $L_{ha}$ is the length of the anti-causal part of the channel impulse response and $L_{hc}$ is the length of the causal part of the channel impulse response. The length of the training sequence is $L_n$.

A least squares channel impulse response estimate is one choice for the initial estimate of the channel impulse response. A vector a of length $L_n$ of a priori known training symbols is given by the following expression:

$$a = [a_0, \ldots, a_{L_n-1}]^T \quad (11)$$

The vector of received symbols is given by the following equation:

$$y = [y_{L_{hc}}, \ldots y_{L_n-L_{ha}-1}]^T \quad (12)$$

The first received training symbol is designated $y_0$. Typically, this would mean that $y_0$ contains a contribution from the first transmitted training symbol multiplied by the maximum magnitude tap of h. Vector y contains a portion of the received training symbol sequence with no other unknown symbols, and does not include $y_0$.

A convolution matrix A of size $(L_n-L_{ha}-L_{hc})\times(L_{ha}+L_{hc}+1)$ may be formed from the known training symbols as given by the following equation:

$$A = \begin{bmatrix} a_{Lha+Lhc} & a_{Lha+Lhc-1} & \cdots & \cdots & \cdots & a_0 \\ a_{Lha+Lhc+1} & a_{Lha+Lhc} & & & & a_1 \\ \cdots & \cdots & & & & \cdots \\ \cdots & \cdots & & & & \cdots \\ \cdots & \cdots & & & & \cdots \\ a_{Ln-1} & a_{Ln-2} & \cdots & \cdots & \cdots & a_{Ln-Lha-Lhc-1} \end{bmatrix} \quad (13)$$

Because the vector y of received symbols is given by the following equation:

$$y = Ah + v \quad (14)$$

where h is the channel impulse response vector of length $L_h$ and v is a noise vector, the least squares channel impulse response estimate is given by the solution of equation (14) according to the following equation:

$$\hat{h}_\Theta = (A^T A)^{-1} A^T y \quad (15)$$

However, this method is only effective if $L_n$ satisfies the following inequality:

$$L_n \geq 2L_h - 1 \quad (16)$$

If the training sequence is too short with respect to the length of the channel impulse response, then this method does not produce a good result because the system of equations (14) to be solved is underdetermined, which is often the case for 8 VSB terrestrial channels. For example, with $L_n=704$, the channel impulse response must be less than 352 symbols long. However, longer channel impulse responses are commonly found in practice.

A better method for finding the channel impulse response is based on a modified convolution matrix A. A long vector a of length $L_n$ of a priori known training symbols is again given by the expression (11). However, the convolution matrix A this time is an $(L_n+L_{ha}+L_{hc})\times L_h$ convolution matrix comprising training symbols and zeros and is given by the following equation:

$$A = \begin{bmatrix} a_0 & 0 & \ldots & \ldots & \ldots & \ldots & \ldots & 0 \\ \ldots & a_0 & 0 & & & & & \ldots \\ \ldots & & & & & & & \ldots \\ \ldots & & & & & 0 & 0 \\ a_{Lh-2} & \ldots & \ldots & \ldots & \ldots & \ldots & a_0 & 0 \\ a_{Lh-1} & \ldots & \ldots & \ldots & \ldots & \ldots & \ldots & a_0 \\ \ldots & & & & & & & \ldots \\ \ldots & & & & & & & \ldots \\ \ldots & & & & & & & \ldots \\ a_{Ln-1} & \ldots & \ldots & \ldots & \ldots & \ldots & \ldots & a_{Ln-Lh} \\ 0 & a_{Ln-1} & & & & & & a_{Ln-Lh-1} \\ \ldots & 0 & & & & & & \\ \ldots & & & & & & & \\ \ldots & & & & & & a_{Ln-1} & a_{Ln-2} \\ 0 & \ldots & \ldots & \ldots & \ldots & \ldots & 0 & a_{Ln-1} \end{bmatrix} \quad (17)$$

The vector of received symbols is given by the following equation:

$$y = [y_{-Lha}, \ldots, y_0, \ldots, y_{Ln+Lhc-1}]^T \quad (18)$$

where $y_0$ through $y_{Ln-1}$ are the received training symbols. So, the vector of equation (18) contains the known training symbols as well as random symbols before and after the training sequence.

Again, equation (14) needs to be solved. Now, the convolution matrix A is a taller matrix because zeros have been substituted for the unknown symbols that surround the training sequence. This new convolution matrix A yields an over-determined system of equations.

The initial channel impulse response and noise estimator 48 solves equation (14) according to equation (15) using the new convolution matrix A of equation (17) and vector y of equation (18) to produce the initial channel impulse response estimate $\hat{h}_0$. More complicated methods may be utilized to give even more accurate results if necessary.

The tap weight calculator 50 uses the initial channel impulse response estimate $\hat{h}_0$ to calculate an initial set of minimum mean square error (MMSE) tap weights for the decision feedback equalizer 52. Methods for calculating minimum mean square error tap weights from a channel impulse response are well known. Alternatively, tap weight calculator 50 may use other methods such as the zero-forcing method to calculate the tap weights.

Accurate channel impulse response estimate updates can also be calculated between training sequences (when only a priori unknown symbols are received). For example, a least squares channel impulse response estimation may be calculated from an over determined system of equations. Dynamic changes to the channel impulse response may be accurately tracked by using receiver trellis decoder decisions on input symbols to form a long sequence of near perfectly decoded symbols. This sequence should have relatively few errors, even near threshold, and is selected to be long enough so that the underdetermined system problem of the "too short" 8 VSB training sequence is eliminated. The channel impulse response may be, for example, updated as often as once per segment (or more or less often).

The updated channel impulse response to be estimated is, as before, of length $L_h = L_{ha} + L_{hc} + 1$ where $L_{ha}$ is the length of the anti-causal part of the channel impulse response and $L_{hc}$ is the length of the causal part of the channel impulse response. A vector b is defined as the reliable trellis decoder decisions on the input symbols of length $L_b$, and is provided by the long traceback 12-phase trellis decoder 44. Also, a Toeplitz matrix B is defined according to the following equation:

$$B = \begin{bmatrix} b_{Lh-1} & b_{Lh-2} & \ldots & \ldots & \ldots & \ldots & \ldots & b_0 \\ \ldots & b_{Lh-1} & \ldots & \ldots & \ldots & \ldots & \ldots & \ldots \\ \ldots & \ldots & & & & & \ldots & \ldots \\ \ldots & \ldots & & & & & \ldots & \ldots \\ \ldots & \ldots & & & & & \ldots & b_{Lh-1} \\ \ldots & \ldots & & & & & \ldots & \ldots \\ \ldots & \ldots & & & & & b_{Lb-Lh} & \ldots \\ b_{Lb-1} & b_{Lb-2} & \ldots & \ldots & \ldots & \ldots & \ldots & b_{Lb-Lh} \end{bmatrix} \quad (19)$$

where the elements are real and consist of the symbol decisions of vector b. To ensure an over determined system of equations, $L_b$ is given by the following inequality:

$$L_b \geq 2L_h - 1 \quad (20)$$

The Toeplitz matrix B is of dimension $(L_b - L_h + 1) \times L_h$ with $(L_b - L_h + 1) \geq L_h$.

The received signal vector is y with elements $y_i$ for $L_{hc} \leq i \leq (L_b - L_{ha} - 1)$ where $y_i$ is the received symbol corresponding to input symbol decision $b_i$. Typically this correspondence would mean that $y_i$ contains a contribution from $b_i$ multiplied by the maximum magnitude tap weight of h. The received signal vector y is given by the following equation:

$$y = Bh + v \quad (21)$$

where h is the $L_h$ long channel impulse response vector and v is a noise vector. The least squares solution for h is given by the following equation:

$$\hat{h}_{LS} = (B^T B)^{-1} B^T y \quad (22)$$

By utilizing reliable trellis decoder input symbol decisions, there is sufficient support for calculating a channel impulse response estimate with the required delay spread. As required by inequality (20), the vector b of symbol decisions must be at least twice as long as the channel impulse response being estimated. The system of equations is sufficiently over determined in order to diminish the adverse affect of additive White Gaussian Noise (AWGN). Therefore, a vector b of symbol decisions that is longer than twice the channel impulse response length is preferred.

The tap weight calculations performed by the tap weight calculator 50 and the tap weight calculator 64 require not only a channel impulse response estimate but also a noise estimate. The noise may be estimated by calculating an estimate of the received vector y according to $\hat{y} = A\hat{h}$ where $\hat{h}$ is the latest calculated channel impulse response estimate. Then, the noise estimation is given by the following equation:

$$\hat{\sigma}^2 = \frac{\|\hat{y} - y\|^2}{\text{length}(y)} \quad (23)$$

where $\|.\|$ is the 2-norm.

In order to apply the above equations to an 8 VSB receiver, the following parameters may be used as an example: $L_h=512$, $L_{ha}=63$, $L_{hc}=448$, $L_b=2496$, and $L_n=704$. The vector b is formed from a sequence of trellis decoder decisions made by the long traceback 12-phase trellis decoder 44 on the input symbols. The delay (31×12=372) of the long traceback 12-phase trellis decoder 44 is not significant compared to a channel impulse response estimate update rate of once per segment. Normally, the long traceback 12-phase trellis decoder 44 would just make output bit pair decisions, but it can also make equally reliable decisions on the input symbols.

The vector b, for example, may be selected as 3 segments ($L_b$=2496 symbols) long. So, three data segments may be used to produce a single channel impulse response estimate update. A new channel impulse response update can be obtained once per segment by proceeding in a sliding window manner. Optionally, several consecutive channel impulse response estimate updates can be averaged in order to further improve channel impulse response accuracy if necessary. This additional averaging can be a problem if the channel impulse response is varying rapidly.

A vector b with fewer than three segments of symbol decisions may be used. However, as stated in inequality (20), the length of the vector b must be at least twice as long as the channel impulse response to be estimated. As previously stated, long b vectors helps to diminish the adverse effects of AWGN.

Figure 6:
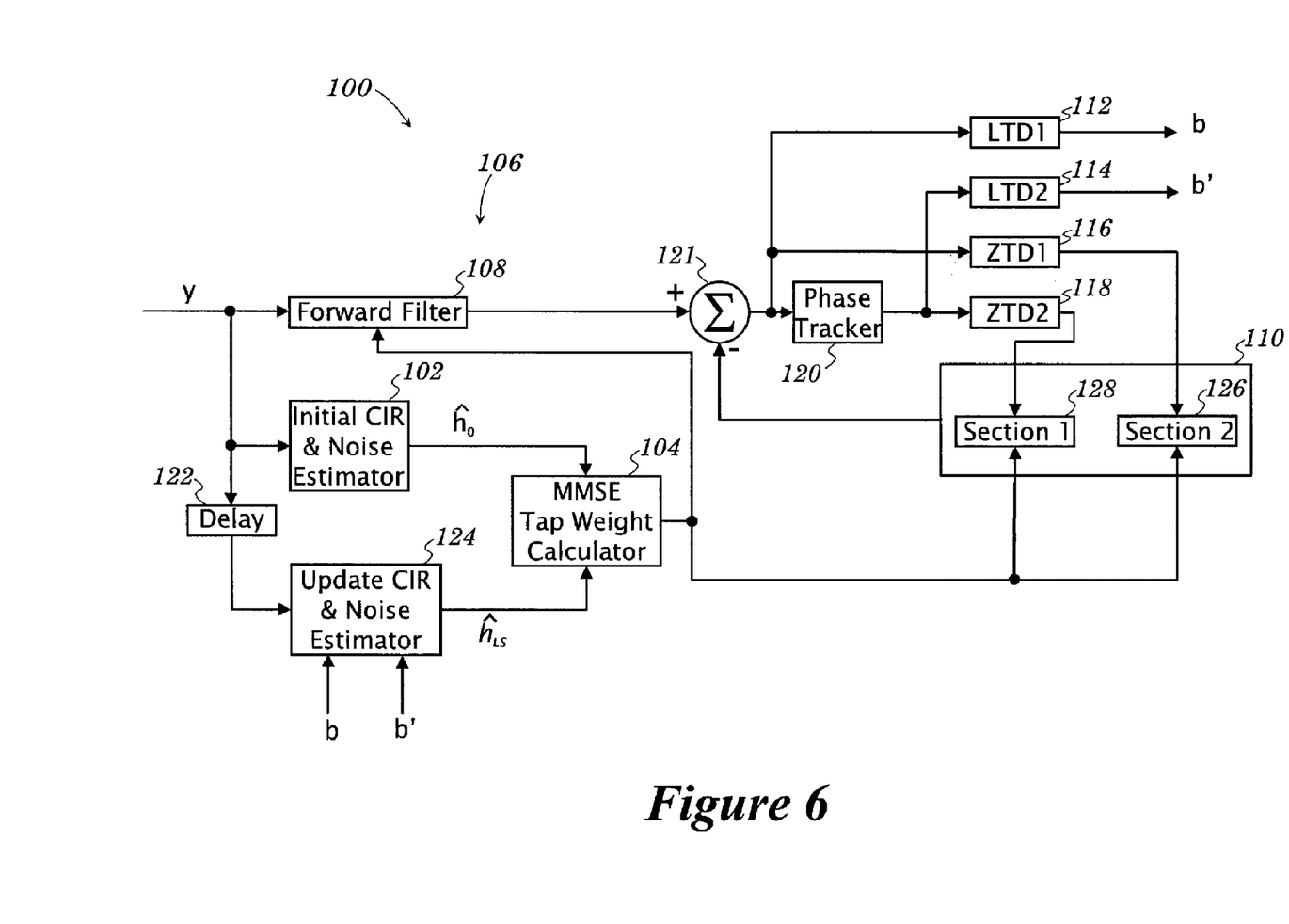
FIG. 6 illustrates a tracking decision feedback equalizer system according to an embodiment of the present invention.

FIG. 6 illustrates a decision feedback equalizer system 100 according to an example embodiment of the present invention. For convenience, the automatic gain controller 46 has been omitted from FIG. 6. However, it should be understood that the automatic gain controller 46 may be part of the decision feedback equalizer system 100, as desired.

Initial tap weights are calculated as described above. Accordingly, an initial channel impulse response and noise estimator 102 uses a training sequence to provide an initial estimate $\hat{h}_0$ of the channel impulse response. A tap weight calculator 104 calculates an initial set of tap weights based on the initial estimate $\hat{h}_0$ of the channel impulse response using, for example, a MMSE based algorithm, and supplies this initial set of tap weights to a decision feedback equalizer 106 comprising a feed forward filter 108 and a feedback filter 110. At all other times, and as discussed below, symbols decisions b and b' are used to calculate the tap weights which are then applied to the feed forward filter 108 and a feedback filter 110 of the decision feedback equalizer 106.

The decision feedback equalizer system 100 makes use of four 12-phase trellis decoders 112, 114, 116, and 118 and a phase tracker 120. Each of the 12-phase trellis decoders 112 and 114 has a long traceback depth, and each of the 12-phase trellis decoders 116 and 118 has a short traceback depth. A summer 121 sums the outputs of the feed forward filter 108 and the feedback filter 110 to provide an equalized output that is provided to the long traceback delay 12-phase trellis decoder 112, to the short traceback delay 12-phase trellis decoder 116, and to the phase tracker 120.

The signal y to be equalized is delayed by a delay 122, and the delayed signal y, the symbol decisions b from the long traceback delay 12-phase trellis decoder 112, and the symbol decisions b' from the long traceback delay 12-phase trellis decoder 114 are processed by a channel impulse and noise update estimator 124 that produces an updated channel impulse estimate $\hat{h}_{LS}$. The tap weight calculator 104 uses the updated channel impulse estimate $\hat{h}_{LS}$ to calculate an updated set of tap weights for the decision feedback equalizer 106. As before, the tap-weights determined by the tap weight calculator 104 based on the symbol decisions b and b' are provided to the decision feedback equalizer 106 during periods when the tap weights based on the training sequence are not available. The delay imposed by the delay 122 is equal to the sum of the delay of the decision feedback equalizer 106 plus the delay the long traceback 12-phase trellis decoders 112 or 114.

Phase trackers, such as the phase tracker 120, are discussed in detail in U.S. Pat. No. 5,406,587 and also the ATSC standards document A/154. They are effective in reducing the carrier phase noise remaining after down converting a received signal to baseband. Thus, a trellis decoder fed by a phase tracker will produce a more reliable output than if the phase tracker was not present. However, a phase tracker causes an additional processing delay that must be considered.

Figure 7:
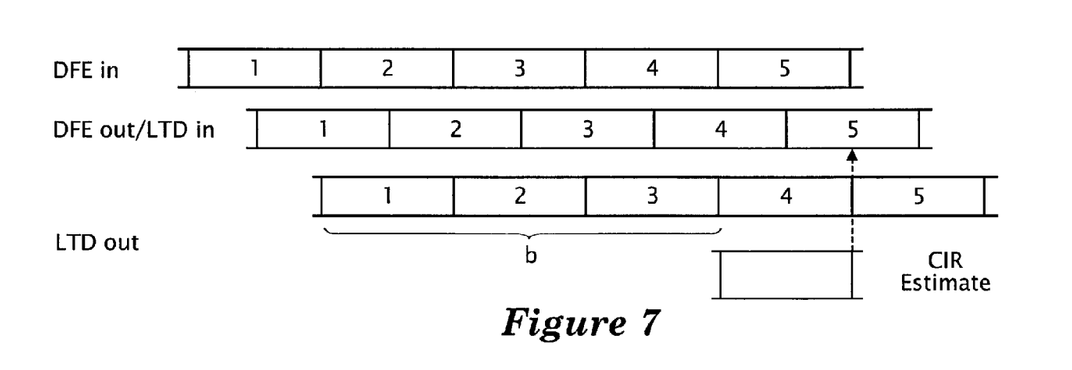
FIG. 7 is a timing diagram illustrating the non-zero time period required for the calculation of a channel impulse estimate and updated tap weights.

A decision feedback equalizer system similar to the decision feedback equalizer system 40 of FIG. 5 but with only the 12-phase trellis decoder 44 having a long traceback depth (i.e., without the short traceback depth 12-phase trellis decoder 42) would operate similarly to the timing diagram of FIG. 7. The first row of this timing diagram represents a series of segments of the signal y as these segments are input to the feed forward filter of the decision feedback equalizer. The second row shows the timing of the decision feedback equalizer output (i.e., the output of the summer 58). Thus, this second row shows the processing delay imposed by the decision feedback equalizer. The third row shows the timing of the output of the long traceback depth 12-phase trellis decoder. Thus, this third row shows the processing delay imposed by the long traceback depth 12-phase trellis decoder. For ease of understanding, it may be assumed that these delays are each ½ segment time.

In addition, a channel impulse and noise update estimator and a tap weight calculator, when implemented in hardware, require some non-zero period of time to execute their respective calculations. For ease of understanding, it may be assumed that this time, for example, is equal to one segment time (832 symbol clocks for the case of 8 VSB). This processing time results in a tap weight update rate of once per segment. As shown by the four lines of FIG. 7, when the tap weights are updated based on the output (vector b) of the long traceback depth 12-phase trellis decoder for segments 1, 2 and 3, this additional processing time means that the new tap weights will not be applied to the filters of the decision feedback equalizer until after ½ of segment 5 has been output by the decision feedback equalizer. This segment delay may be referred to as the update latency.

Figure 8:
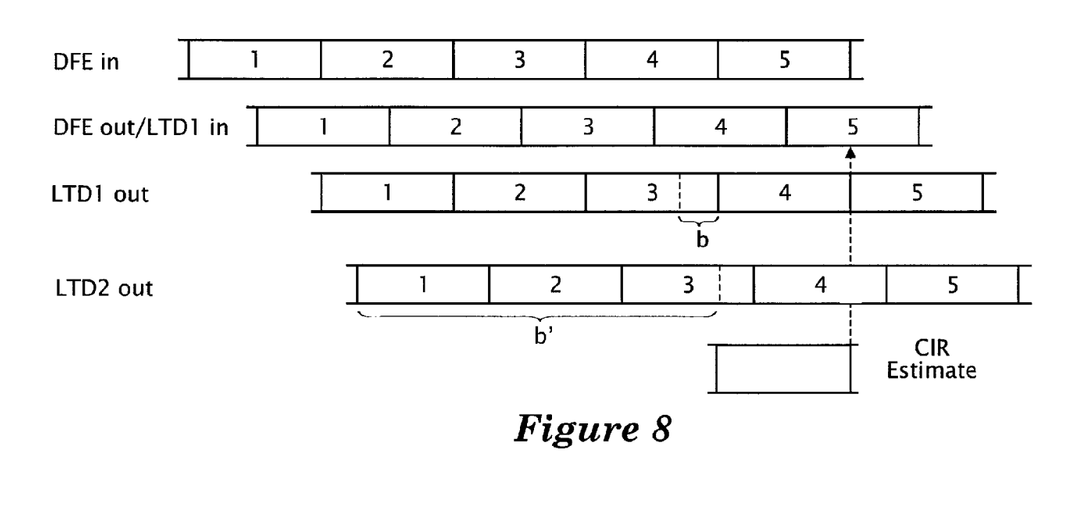
FIG. 8 is a timing diagram useful in illustrating the improved performance resulting from the tracking decision feedback equalizer system of FIG. 7; and, FIG. 9 illustrates in additional detail the feedback filter of the tracking decision feedback equalizer system of FIG. 7.

By contrast, the timing diagram for the decision feedback equalizer system 100 of FIG. 6 is shown in FIG. 8. Again, the first row of the timing diagram shown in FIG. 8 represents a series of segments of the signal y as these segments are input to the feed forward filter 108 of the decision feedback equalizer 106. The second row of the timing diagram shown in FIG. 8 shows the timing of the output of the decision feedback equalizer 106 (i.e., the output of the summer 121). Thus, this second row shows that there is a processing delay imposed by the decision feedback equalizer 106. The output of the decision feedback equalizer 106 is provided as inputs to the long traceback depth 12-phase trellis decoder 112, the zero traceback delay 12-phase trellis decoder 116, and the phase tracker 120. The third row of the timing diagram shown in FIG. 8 shows the timing of the output of the long traceback depth 12-phase trellis decoder 112. Thus, this third row shows that there is a processing delay imposed by the long traceback depth 12-phase trellis decoder 112. The fourth row of the timing diagram shown in FIG. 8 shows the timing of the output of the long traceback depth 12-phase trellis decoder 114. Thus, this fourth row shows that there is a processing delay imposed by the long traceback depth 12-phase trellis decoder 114 and the phase tracker 120. This example timing is assumed for convenience to include a ¼ segment (208 8-VSB symbol periods) delay for the processing of the phase tracker 120.

The channel impulse and noise update estimator 124 is provided with and uses a combination of symbol decisions comprised of symbol decisions b from the long traceback delay 12-phase trellis decoder 112 and symbol decisions b' from the long traceback delay 12-phase trellis decoder 114. These symbol decisions are shown in FIG. 8. As shown, the symbol decisions b' at the output of the long traceback delay 12-phase trellis decoder 114 are taken from segments 1 and 2 and from part of segment 3 in the fourth row of the timing diagram of FIG. 8, and the symbol decisions b at the output of the long traceback delay 12-phase trellis decoder 112 are taken from the rest of segment 3 in the third row of the timing diagram of FIG. 8. Accordingly, if the symbol decisions b were concatenated to the symbol decisions b', the resulting concatenation would extend for three full segments.

As can be seen, the long traceback delay 12-phase trellis decoders 112 (without the delay of the phase tracker 120) provides the most recent symbol decisions, and the long traceback delay 12-phase trellis decoders 114 provides more reliable decisions that are delayed by the delay of the phase tracker 120. In this manner, most of the symbol decisions used for the channel impulse response estimate update have better reliability than is provided by the decision feedback equalizer system 40 of FIG. 5 without increasing the update latency.

Accordingly, as can be seen from FIG. 8, the amount of the symbol decisions b corresponds to the delay imposed by the phase tracker 120. In this manner, more accurate symbol decisions (b') are used in determining the channel impulse response without paying the penalty of the additional processing delay that achieves the more accurate symbol decisions.

In connection with the decision feedback equalizer system 40 of FIG. 5, the output of the zero traceback delay 12-phase trellis decoder 42 is shifted one symbol decision at a time into the shift register of the feedback filter 56, with the newest "zero delay" symbol decision entering the shift register of the feedback filter 56 and pushing forward previous zero delay symbol decisions.

However, as shown in FIG. 6, the shift register of the feedback filter 110 is divided into two sections 126 and 128 with the length of the section 126 corresponding to the delay of the phase tracker 120. The output of the zero traceback delay 12-phase trellis decoder 116 feeds the section 126. The output of the zero traceback delay 12-phase trellis decoder 118, which incurs the additional delay due the phase tracker 120 in its path, provides more reliable delayed symbol decisions and feeds the section 128. The symbol decisions in the section 126 are never shifted into the section 128, which gets its symbol decisions directly from the zero traceback delay 12-phase trellis decoder 118. In this manner, more reliable decisions are provided to the section 128 of the feedback filter 110. The section 126 of the feedback filter 110 is used so that a zero delay situation can be maintained for the most recent symbol decisions.

Figure 9:
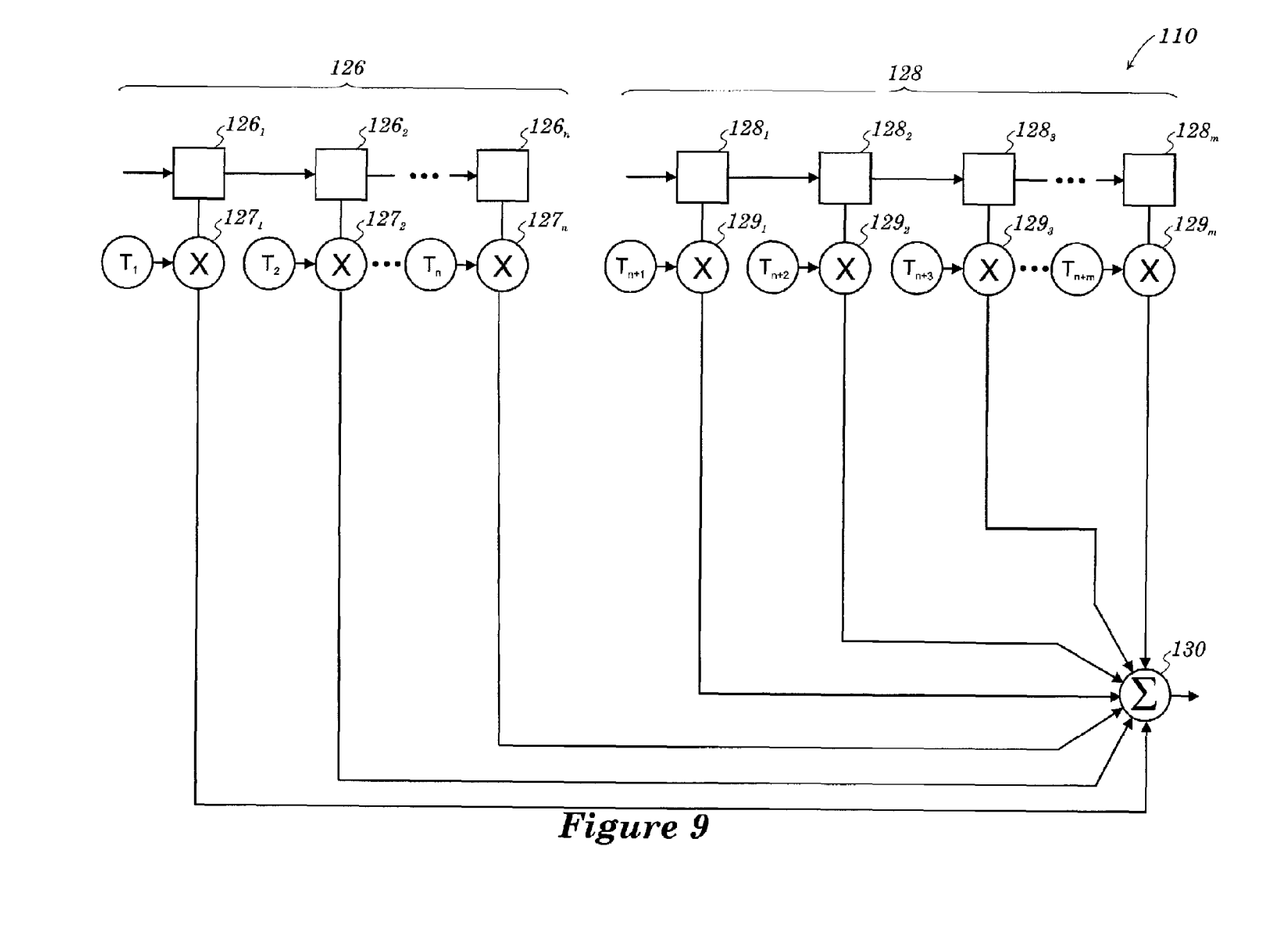

The feedback filter 110 is shown in greater detail in FIG. 9. The section 126 of the feedback filter 110 includes a shift register having storage elements $126_1, 126_2, \ldots, 126_n$. The data stored in each of the storage elements $126_1, 126_2, \ldots, 126_n$ is provided to a corresponding one of a plurality of multipliers $127_1, 127_2, \ldots, 127_n$. Each of the multipliers $127_1, 127_2, \ldots, 127_n$ also receives a corresponding one of the tap weights $T_1, T_2, \ldots, T_n$. Each of the multipliers $127_1, 127_2, \ldots, 127_n$ multiplies the input that it receives from its corresponding one of the storage elements $126_1, 126_2, \ldots, 126_n$ by a corresponding one of the tap weights $T_1, T_2, \ldots, T_n$. The multiplication results are provided to a summer 130.

Similarly, the section 128 of the feedback filter 110 includes a shift register having storage elements $128_1, 128_2, 128_3, \ldots, 128_m$. The data stored in each of the storage elements $128_1, 128_2, 128_3, \ldots, 128_m$ is provided to a corresponding one of a plurality of multipliers $129_1, 129_2, 129_3, \ldots, 129_m$. Each of the multipliers $129_1, 129_2, 129_3, \ldots, 129_m$ also receives a corresponding one of the tap weights $T_{n+1}, T_{n+2}, T_{n+3}, \ldots, T_{n+m}$. Each of the multipliers $129_1, 129_2, 129_3, \ldots, 129_m$ multiplies the input that it receives from its corresponding one of the storage elements $128_1, 128_2, 128_3, \ldots, 128_m$ by a corresponding one of the tap weights $T_{n+1}, T_{n+2}, T_{n+3}, \ldots, T_{n+m}$. The multiplication results are provided to a summer 130.

The summer 130 sums all of these inputs and provides the summation result as the output of the feedback filter 110. As shown in FIG. 6, the data in the section 126 is not shifted into the section 128. However, both of the sections 126 and 128 are used in generating the output of the feedback filter 110.

Certain modifications of the present invention have been discussed above. Other modifications of the present invention will occur to those practicing in the art of the present invention. For example, the decoders 112, 114, 116, and 118 are described above as 12-phase trellis decoders. The use of 12-phase trellis decoders is, for the most part, specific to the digital television application in compliance with the ATSC standard. For other applications, however, decoders other than 12-phase trellis decoders may be used.

As another example, tap weight calculator 104 as described above calculates tap weights using, for example, a MMSE based algorithm. However, other methodologies may be used to calculate tap weights.

As yet another example, circuits other than phase trackers can be used in the present invention to provide correction of the received signal, of the equalized signal, and/or of the decoded signal. Any delay that results from the use of such other circuits can be mitigated in the manner suggested by FIG. 8.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:
1. A method of operating an equalizer having taps comprising:
   equalizing received symbols by use of the equalizer to produce equalized symbols;
   applying a correction to the equalized symbols to produce corrected symbols characterized by a processing delay d;
   decoding the equalized symbols to provide first symbol decisions;
   decoding the corrected symbols to provide second symbol decisions;
   calculating tap weights for the equalizer in response to received symbols and in response to a number of the first symbol decisions covering a time span b and in response to a number of the second symbol decisions covering a time span b', wherein the time span b substantially equals the processing delay d; and, applying the calculated tap weights to the equalizer.

2. The method of claim 1 wherein the second symbol decisions covering the time span b coincide in time with the latest of the second symbol decisions covering the time span b'.

3. The method of claim 1 wherein the calculating of tap weights for the equalizer comprises applying a sliding window to the sequences of the decoded symbols.

4. The method of claim 1 further comprising calculating training tap weights for the equalizer in response to a received training sequence, wherein the received training sequence comprises $L_n$ symbols, wherein the first symbol decisions comprise $L_b$ symbol decisions, wherein the second symbol decisions comprise $L_{b'}$ symbol decisions, and wherein $L_b + L_{b'} > L_n$.

5. The method of claim 4 wherein $L_b + L_{b'} > 3L_n$.

6. The method of claim 5 wherein $L_b + L_{b'} = 2496$ decoded data symbols, and wherein $L_n = 704$ training sequence symbols.

7. The method of claim 1 wherein the equalizing of the received symbols comprises:

filtering the received symbols by use of a feed forward filter to produce first filtered symbols;

filtering the first and second symbol decisions to produce second filtered symbols; and, combining the first and second filtered symbols to produce the equalized symbols.

8. The method of claim 7 wherein the filtering of the first and second symbol decisions to produce second filtered symbols comprises:

processing the first symbol decisions in a first section of a feedback filter;

processing the second symbol decisions in a second section of the feedback filter; and, combining the processed first and second symbol decisions to produce the second filtered symbols, wherein the symbols processed by the first section of the feedback filter are not supplied to the second section of the feedback filter.

9. The method of claim 1 wherein the calculating of tap weights for the equalizer comprises calculating updated tap weights for the equalizer, and wherein the method further comprises:

determining a training estimate of a channel based on a received training sequence;

calculating training tap weights for the equalizer dependent upon the training estimate of a channel; and, applying the training tap weights to the equalizer, wherein the updated tap weights are applied to the equalizer only during periods of time when the training sequence is not being received.

10. The method of claim 9 wherein the determining of a training estimate of a channel comprises determining a training estimate of the channel based on the following equation:

$$\hat{h}_\Theta = (A^T A)^{-1} A^T y$$

wherein $\hat{h}_\Theta$ is the training channel estimate, wherein A is a matrix based on the training sequence, and wherein y comprises the received symbols.

11. The method of claim 10 wherein the matrix A comprises an $(L_n + L_{ha} + L_{hc}) \times L_h$ convolution matrix, wherein $L_n$ is the number of symbols in the training sequence, wherein $L_{ha}$ is the length of the anti-causal part of the impulse response of the channel, wherein $L_{hc}$ is the length of the causal part of the impulse response of the channel, and wherein $L_h = L_{ha} + L_{hc} + 1$.

12. The method of claim 11 wherein the matrix A is stuffed with zeros in addition to the training sequence to achieve the dimension of $(L_n + L_{ha} + L_{hc}) \times L_h$.

13. The method of claim 9 wherein the determining of a training estimate of a channel comprises determining a training estimate of the channel based on the following equation:

$$y = Ah + v$$

wherein h is the training channel estimate, wherein A is a matrix based on the training sequence, wherein y is a received signal vector, and wherein v is a noise vector.

14. The method of claim 13 wherein the matrix A comprises an $(L_n + L_{ha} + L_{hc}) \times L_h$ convolution matrix, wherein $L_n$ is the number of symbols in the training sequence, wherein $L_{ha}$ is the length of the anti-causal part of the impulse response of the channel, wherein $L_{hc}$ is the length of the causal part of the impulse response of the channel, and wherein $L_h = L_{ha} + L_{hc} + 1$.

15. The method of claim 14 wherein the matrix A is stuffed with zeros in addition to the training sequence to achieve the dimension of $(L_n + L_{ha} + L_{hc}) \times L_h$.

16. The method of claim 9 wherein the calculating of updated tap weights for the equalizer comprises calculating the updated tap weights based upon an update estimate of a channel determined in accordance with the following equation:

$$\hat{h}_{LS} = (B^T B)^{-1} B^T y$$

wherein $\hat{h}_{LS}$ is the update channel estimate, wherein B is a matrix based on the decoded symbols, and wherein y comprises the received symbols.

17. The method of claim 16 wherein the matrix B comprises an $(L_b - L_h + 1) \times L_h$ convolution matrix, wherein $L_b$ is a number of decoded symbols, wherein $L_b \geq 2L_h - 1$, wherein $L_h = L_{ha} + L_{hc} + 1$, wherein $L_{ha}$ is the length of the anti-causal part of the impulse response of the channel, and wherein $L_{hc}$ is the length of the causal part of the impulse response of the channel.

18. The method of claim 9 wherein the calculating of updated tap weights for the equalizer comprises calculating the updated tap weights based upon an update estimate of a channel determined in accordance with the following equation:

$$y = Bh + v$$

wherein h is the update channel estimate, wherein B is a matrix based on the decoded symbols, wherein y is a received signal vector, and wherein v is a noise vector.

19. The method of claim 18 wherein the matrix B comprises an $(L_b + L_{b'} - L_h + 1) \times L_h$ convolution matrix, wherein $L_b$ is a number of decoded equalized symbols, wherein $L_{b'}$ is a number of decoded phase tracker output symbols, wherein $L_b + L_{b'} \geq 2L_h - 1$, wherein $L_h = L_{ha} + L_{hc} + 1$, wherein $L_{ha}$ is the length of the anti-causal part of the impulse response of the channel, and wherein $L_{hc}$ is the length of the causal part of the impulse response of the channel.

20. The method of claim 9 wherein the determining of a training estimate of the channel based on the training sequence comprises determining a training estimate of the channel based on an over-determined system of equations.

21. The method of claim 20 further comprising determining an update estimate of the channel based on a number of decoded symbols that is larger than the number of symbols in the training sequence.

22. The method of claim 1 wherein the applying of a correction to the equalized symbols to produce corrected symbols comprises applying a phase correction to the equalized symbols to produce phase corrected symbols.

23. A system comprising:
an equalizer having taps with tap weights;
a signal corrector that produces a corrected output based on an output of the equalizer, wherein the corrected output is characterized by a delay d;
a first decoder that decodes the output of the equalizer to recover first decoded data;
a second decoder that decodes the corrected output to recover second decoded data; and,
a tap weight calculator that calculates and applies the tap weights to the equalizer based upon a channel impulse response determined from a received signal, from an amount of the first decoded data covering a time span b, and from an amount of the second decoded data covering a time span b', wherein the time span b is substantially equal to the delay d.

24. The system of claim 23 wherein the first decoded data covering the time span b coincide in time with the latest of the decoded data covering the time span b'.

25. The system of claim 23 wherein the tap weight calculator comprises a first tap weight calculator, wherein the system further comprises a second tap weight calculator, wherein the second tap weight calculator calculates and applies the tap weights to the equalizer based upon a channel impulse response determined from a training sequence, wherein the first tap weight calculator calculates and applies the tap weights to the equalizer based upon the channel impulse response determined from the first and second decoded data, and wherein the first and second decoded data are longer than the training sequence.

26. The system of claim 23 wherein each of the first and second decoders comprises a long traceback trellis decoder.

27. The system of claim 23 wherein the equalizer comprises a decision feedback equalizer, and wherein the decision feedback equalizer comprises:
a third decoder that decodes the output of the equalizer to recover third decoded data;
a fourth decoder that decodes the corrected output to recover fourth decoded data;
a feed forward filter that filters a received signal;
a feedback filter that filters the third and fourth decoded data; and,
a combiner that combines an output from the feedback filter and an output of the feed forward filter to produce the output of the equalizer.

28. The system of claim 27 wherein each of the first and second decoders comprises a long traceback trellis decoder, and wherein each of the third and fourth decoders comprises a short traceback trellis decoder.

29. The system of claim 28 wherein each of the short traceback trellis decoders has a zero delay.

30. The system of claim 27 wherein the tap weight calculator comprises a first tap weight calculator, wherein the system further comprises a second tap weight calculator, wherein the second tap weight calculator calculates and applies the tap weights to the equalizer based upon a channel impulse response determined from a training sequence, wherein the first tap weight calculator calculates and applies the tap weights to the equalizer based upon the channel impulse response determined from the first and second decoded data, and wherein the first and second decoded data are longer than the training sequence.

31. The system of claim 30 wherein each of the first and second decoders comprises a long traceback trellis decoder, and wherein each of the third and fourth decoders comprises a short traceback trellis decoder.

32. The system of claim 31 wherein each of the short traceback trellis decoders has a zero delay.

33. The system of claim 27 wherein the feedback filter comprises a first section that processes the third decoded data and a second section that processes the fourth decoded data, and wherein data processed by the first section is not supplied to the second section for processing.

34. The system of claim 23 wherein the signal corrector comprises a phase tracker.

35. A method of operating an equalizer having taps comprising:
decoding an equalized output of the equalizer to produce first decoded data having a first accuracy;
applying phase tracking to the equalized output of the equalizer to produce a phase tracked output;
decoding the phase tracked output to produce second decoded data having a second accuracy, wherein the second accuracy is greater than the first accuracy;
calculating tap weights for the equalizer using the first and second decoded data; and,
applying the calculated tap weights to the taps of the equalizer.

36. The method of claim 35 wherein the calculated tap weights comprise updated tap weights, wherein the method further comprises calculating initialized tap weights in response to a training sequence, and wherein the applying of the calculated tap weights to the taps of the equalizer comprises applying the initialized tap weights to the taps of the equalizer during periods of time when the training sequence is available and otherwise applying the updated tap weights to the taps of the equalizer.

37. The method of claim 36 wherein the training sequence is derived from a frame sync segment of an ATSC compliant frame.

38. The method of claim 1 wherein the time span b and the time span b' overlap.

39. The system of claim 23 wherein the time span b and the time span b' overlap.

* * * * *